United States Patent [19]

Lassiter

[11] Patent Number: 4,734,306
[45] Date of Patent: Mar. 29, 1988

[54] COLD WEATHER GARMENT WITH SKIN FOAM AND METHOD OF MAKING SAME

[75] Inventor: B. Dean Lassiter, Greensboro, N.C.

[73] Assignee: Burlington Industries, Inc., Greensboro, N.C.

[21] Appl. No.: 31,661

[22] Filed: Mar. 30, 1987

Related U.S. Application Data

[63] Continuation-in-part of Ser. No. 879,053, Jun. 26, 1986, Pat. No. 4,690,847.

[51] Int. Cl.$^4$ .................... B32B 3/26; B32B 5/18; B32B 7/08; B32B 31/00
[52] U.S. Cl. .................................. 428/71; 156/91; 156/93; 156/264; 156/265; 428/102; 428/103; 428/159; 428/160; 428/246; 428/316.6; 428/318.8
[58] Field of Search ............ 156/91, 93, 264, 265; 428/71, 102, 103, 159, 160, 316.6, 318.8, 246

[56] References Cited

U.S. PATENT DOCUMENTS

| | | | |
|---|---|---|---|
| 2,897,508 | 8/1959 | Bashore et al. | 2/93 |
| 2,976,539 | 12/1953 | Brown | 2/2 |
| 3,709,965 | 1/1973 | Campbell | 264/45.5 |
| 4,242,463 | 12/1980 | Sanok et al. | 521/51 |
| 4,518,557 | 5/1985 | Wecker | 264/45.9 |
| 4,583,247 | 4/1986 | Fingerhut et al. | 2/69 |

OTHER PUBLICATIONS

Fieldbook, Boy Scouts of America, 1984, pp. 65–67, 76–89, 331–335.
"Cozy Quip" advertising brochure (no date).
"The Moter Earth News", No. 91, pp. 160, 161, Jan.-/Feb. 1985.

*Primary Examiner*—William J. Van Balen
*Attorney, Agent, or Firm*—Nixon & Vanderhye

[57] ABSTRACT

A cold weather garment is produced from inner and outer fabrics and a layer of open cell skinned foam at least ¼ inch thick, and preferably about ¾ inch thick. The skin may be provided on a major flat face of the foam and the other face convoluted, or both faces can be skinned, or the foam layer may include two or more thicknesses of skinned foam. The garments provide better wind resistance than garments with simple open cell foam constructions and allow the selection of a wider variety of outer fabrics while still having the desired MVT, insulation, and wind resistance properties. The skinned foam is also easier to handle, cut, and sew during the construction of cold weather garments.

22 Claims, 5 Drawing Figures

FIG. 3
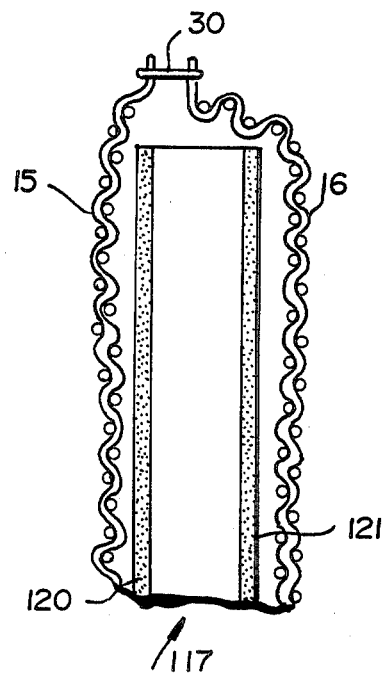
FIG. 4
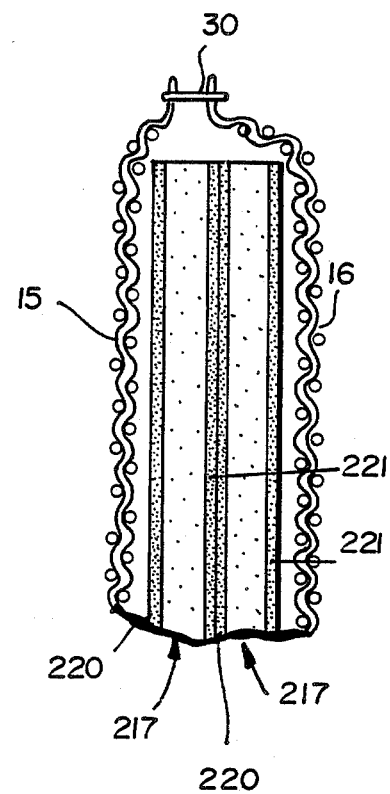
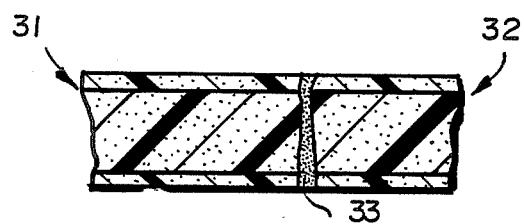
FIG. 5

COLD WEATHER GARMENT WITH SKIN FOAM AND METHOD OF MAKING SAME

CROSS-REFERENCE TO RELATED APPLICATION

This application is a continuation-in-part of application Ser. No. 879,053 filed June 26, 1986, now U.S. Pat. No. 4,690,847.

BACKGROUND AND SUMMARY OF THE INVENTION

A known cold weather garment system which has been proven effective over the last decade and a half is commonly known as a Phillips system. An improvement over the Phillips system is described in the parent application Ser. No. 879,053, the disclosure of which is hereby incorporated by reference herein. This invention relates to yet another improvement over the Phillips system.

The known drawbacks of the Phillips system include poor wind resistance and water repellency; difficulties in mass production because of the problems associated with cutting, handling, and sewing one inch thick open cell foam into a finished garment; a bulky construction which is uncomfortable to some users; and an appearance that oftentimes appears "bloated". In co-pending application Ser. No. 885,444 filed July 14, 1986, the disclosure of which is also incorporated herein, the poor wind resistance of the Phillips system is overcome by utilizing a high density woven fabric as the outer shell fabric. While such a construction solves the poor wind resistance problem associated with the prior art Phillips system, it does not address the other drawbacks discussed above, and outer fabrics which satisfy the requirement for solving the poor wind resistance problems oftentimes are expensive and easily torn.

According to the present invention a cold weather garment is provided which overcomes the drawbacks associated with the prior art Phillips system while still retaining its unique advantageous features of excellent cold weather insulation and excellent transmission of moisture produced by perspiration. The advantageous results achieved according to the present invention are achieved by providing a particular type of foam as part of the basic cold weather garment construction, the foam according to the invention being substituted for the conventional polyurethane foam in the Phillips prior art system. By making this simple—in hindsight—substitution, the invention achieves a number of unexpected advantageous results. These advantageous results include good wind resistance; the ability to achieve good wind resistance even with a lower cost shell fabric than is provided in the parent application; good water repellency; reduced bulkiness and therefore increased wearer comfort and appearance; and greatly improved ease of construction.

According to the present invention, the cold weather garment includes an interior lining fabric and an outer fabric with a layer of open cell foam between them, just like in the Phillips prior art system. The difference is the utilization of a foam layer which is a "skin foam" or "skinned foam". The partially open cell skin foam has a thickness of at least about $\frac{1}{4}$ inch, and preferably between $\frac{1}{4}$ and $\frac{3}{4}$ of an inch. At least one major face of the foam layer is flat, and has a skin, a flat skinned face being in contact with the outer fabric, and enhancing the ease of construction and wind resistance of the garment. The foam layer may be composed of a single piece of foam, and the second major face of the single piece of foam also may be flat and skinned, or it may be convoluted, or it may flat and not skinned, depending upon the particular other parameters selected. Where it is convoluted, the convoluted face will have a construction such as described in the parent application.

As an alternative construction, instead of a single thickness piece of foam being provided as the foam layer, a plurality of smaller thickness pieces of foam may be provided as the foam layer; for example instead of one $\frac{3}{4}$ inch thick piece of polyurethane foam, two $\frac{3}{8}$ inch thick pieces may be provided. Dual construction, with both pieces having a skinned face, enhances the wind resistance of the garment.

The final garment according to the invention must have a moisture vapor transmission value rate of at least 500 grams per square meter per 24 hours. The foam layer should have an air permeability of less than about 10 cfm/square feet at a pressure of 0.5 inches of water. The foam layer also should have a spray resistance of less than 100 percent wet pickup at a 90 degree angle of impact and less than 150 degrees wet pickup at a 45 degree angle. Further, the skinned foam face (or all skinned faces where there are more than one) should have a surface friction of less than about two pounds using a one pound test load.

While the outer fabric can be formed of VERSATECH, as described in the parent application, according to the present invention a less expensive outer fabric may be utilized. For example the outer shell may comprise a tightly knit synthetic yarn fabric having an air permeability value of less than about 10 cubic feet per minute per square foot at a pressure of 0.5 inches of water, and it may be treated with a water repellent coating. More particularly, the outer shell fabric may comprise approximately 210 denier continuous filament nylon warp knit and 3 ply approximately 70 denier air textured nylon filling yarn woven in a plain weave having about 79 ends and about 61 picks per inch.

It is the primary object of the present invention to provide an improved cold weather garment. This and other objects of the invention will become clear from an inspection of the detailed description of the invention, and from the appended claims.

BRIEF DESCRIPTION OF THE DRAWINGS

FIGS. 3 and 4 are side views, like that of FIG. 2, showing two other embodiments according to the invention; and FIG. 5 is a a cross-sectional view of the foam layer of the garment 10 or 11, illustrating an edge-to-edge positioning of two pieces of foam comprising the foam layer.

DETAILED DESCRIPTION OF THE INVENTION

Figure 1:
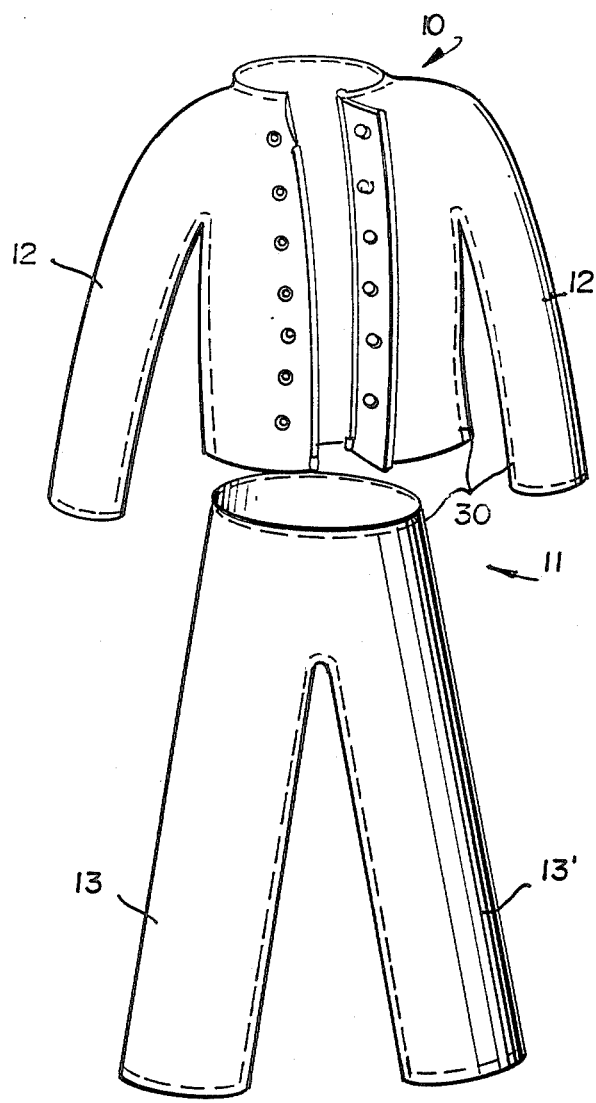
FIG. 1 is a schematic perspective view of an exemplary upper body garment and lower body garment according to the present invention.

Exemplary cold weather garments according to the invention are illustrated schematically in FIG. 1, an upper body garment being illustrated by reference numeral 10, and the lower body garment by reference numeral 11. The upper body garment 10 protects the upper part of the wearer's body, and has arm portions 12 which cover the wearer's arms. The lower body garment 11 protects the lower portion of the wearer's body, and includes leg portions 13. Utilizing the garments 10, 11, the wearer typically needs no other garments in order to provide sufficient cold weather protection for the wearer's body, arms, and legs, although additional garments will be utilized to protect the wearer's hands, feet, and head. While no other additional garments are necessary for cold weather protection, the wearer can, if desired, wear underwear, or like garments, although it is necessary that the wearer avoid wearing any other type of garment (whether inner or outer) which has poor moisture vapor transmission properties.

Figure 2:
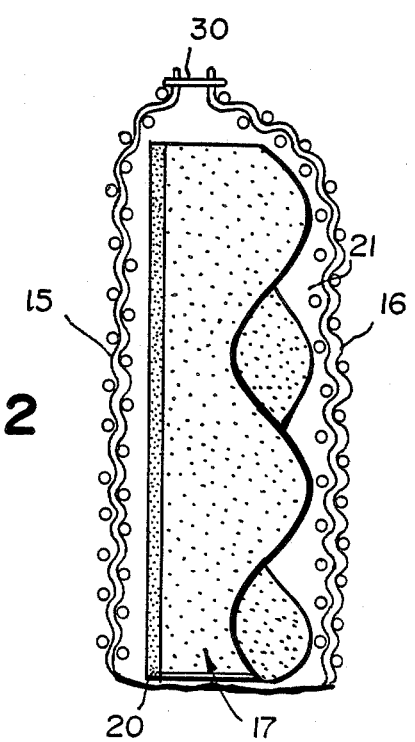
FIG. 2 is a side view of a portion of one of the garments of FIG. 1, with the fabric layers shown in section, and the foam shown in elevation.

One exemplary construction of each of the garments 10, 11, is illustrated in FIG. 2, each of the garments comprising (or consisting of) three layers, comprising an outer or shell fabric layer 15, an inner fabric layer 16, and a layer of partially open cell foam 17 (e.g. polyurethane foam) disposed between the fabric layers 15, 16.

The interior lining fabric 16 is a loosely knit nylon or polyester tricot mesh fabric which has a moisture vapor transmission rate value of at least 1,000 grams per square meter per 24 hours. One example of such a fabric is commercially available from Burlington Industries of Greensboro, N.C., and has the designation "Style No. 18085". The interior lining serves to provide abrasion protection for the foam insulation without inhibiting the transport of moisture vapor from the wearer's body.

The foam layer 17 is at least about $\frac{1}{4}$ inch thick, an preferably is a $\frac{3}{4}$ inch thick layer of skinned partially open cell polyurethane foam. Note the major face 20 of the foam layer 17 which is a flat major face having the "skin" formed thereon. In the particular embodiment illustrated in FIG. 2, the second major face, 21, of the foam layer 17, is convoluted as described in said parent application Ser. No. 879,053 filed June 26, 1986, the disclosure of which has been incorporated by reference herein. Note that the skinned face 20 abuts the outer garment 16.

The skin construction of the foam may be produced by a number of commercially available techniques. One suitable foam that is commercially available is sold under the trade designation "Basic" by Specialty Composites Corporation of Newark, Del. Attention is also directed to the following U.S. patents which teach conventional, techniques for forming skinned foam: U.S. Pat. Nos. 4,518,557; 4,242,463; and 3,709,965.

Two other embodiments of the foam layer, according to the present invention, are illustrated in FIGS. 3 and 4. In FIG. 3, the foam layer 117 has two major skin faces 120, 121, and preferably comprises a single thickness of foam approximately $\frac{3}{4}$ of an inch thick. In the FIG. 4 embodiment, two identical but separate pieces of foam 217 are provided, each having a first major skinned face 220, and a second major skinned face 221. In the FIG. 4 embodiment, the two pieces of foam 217 comprising the foam layer are each about $\frac{3}{8}$ of an inch thick, the composite layer being about $\frac{3}{4}$ of an inch thick.

The skinned foam insulation should have a moisture vapor transmission rate (MVT) value of at least 500 grams per square meter per 24 hours in order to provide for the transport of moisture vapor from the wearer's body. Also the skinned foam insulation should have an air permeability value of less than 10 cfm/sq. foot at a pressure of 0.5 inches of water to provide good wind resistance. Further, the skinned foam insulation should have a spray resistance of less than 100 percent wet pickup (% WPU) at a 90 degree angle of impact and less than 150% WPU at a 45 degree angle of impact to provide for improved water repellency. Finally, it is desirable that the skin foam insulation should have a surface friction of less than two pounds using a one pound test load in order to minimize problems associated with cutting and sewing and handling of the open cell foam sheets and forming the finished garment.

In the manufacture of the garments 10, 11 according to the invention (or other cold weather garments utilizing this foam, such as hats, mittens, parkas, hoods, or the like), the foam first is cut into one or more pieces to generally form the garment shapes. Seams are stitched together to form the basic garment, such as illustrated by reference numeral 30 in FIGS. 1 through 4. The foam pieces may be bonded together in edge-to-edge configuration at the seams using an organic adhesive. For example the two foam sheets 31, 32 illustrated in FIG. 5, forming the foam layer comparable to the layer 17 illustrated in FIG. 2, have their edges in substantial abutting engagement with an organic adhesive 33 holding them together. One example of organic adhesive that may be utilized is available from the John G. Traveler Company of Philadelphia, Pa. and sold under the trade name "FRISYLEN". Utilizing the organic adhesive between the foam pieces 31, 32, instead of stitching them together (which also is an option) can be advantageous since the stitching can compress the foam thereby causing "heat leaks".

Utilizing the skinned foam pieces according to the invention, it is easier to slide them across work surfaces and to align them in edge-to-edge configurations to form the foam layer which will be sandwiched between the two fabric layers.

The outer fabric 16 according to the invention may be "VERSATECH", but need not be in view of the enhanced wind resistance provided by the foam construction. For example the outer shell fabric 16 may be formed of a tightly knit nylon fabric which is made of commercially available approximately 210 denier continuous filament nylon warp yarn and 3 ply approximately 70 denier air textured nylon filling yarn, woven in a plain weave having about 79 ends and about 61 picks per inch. This shell fabric provides an air permeability value of less than 10 cubic feet per square foot per minute at a pressure of 0.5 inches of water, and preferably is treated with the commercially available water repellent, such as one sold by the 3M Company of Minneapolis, Minn. under the trademark "SCOTCHGARD". However other even less expensive outer shell fabrics of synthetic material may be provided, such as military nylon fabrics which have higher air permeabilities than would have been acceptable in the conventional Phillips system as far as wind resistance is concerned. As a matter of fact a variety of outer fabrics 16 may be utilized as long as the MVT value of the composite garment is at least 500 grams per square meter per 24 hours.

Experimental values comparing various properties of foam, fabrics, and composite garments according to the invention with the prior art are indicated by the following tables.

TABLE I

| Foam Sample | MVT | Air Perm | Weight |
|---|---|---|---|
| Prior Art L & P 1112 (¾") | 654 | 205 | 8.3 |
| FIG. 3 Skin Foam (¾") | 545 | 8.17 | 22.0 |
| FIG. 4 Skin Foam (¾") (2 sheets of ⅜" each) | 533 | 5.60 | 20.5 |
| Shell Fabric | | | |
| VERSATECH | 1610 | 1.70 | 2.75 |
| Exp. Nylon | 1333 | 9.78 | 4.94 |
| Prior Art Military Nylon | 1470 | 44.5 | 2.75 |
| Garment Sample | | | |
| VERSATECH/L & P 1112 (¾") | 650 | 1.7 | |
| Exp. Nyl./Skin Foam (¾") | 545 | 8.2 | |
| Exp. Nyl./Skin Foam (¾") (2 sheets of ⅜ inch) | 530 | 5.6 | |
| Prior Art Mil. Nylon/L & P 1112 (¾") | 650 | 45 | |

In Table I, the MVT is in grams per square meter per 24 hours; the air permeability is in cfm per square foot at 0.5 inches water, and weight is in ounces per yard. Note that the second and third garment samples have MVT values and air permeabilities within the desired range, but can be constructed more easily, and less expensively, than the conventional foam with VERSATECH outer garment as described in the first garment sample.

TABLE II

| | Spray Resistance (Percent Wet Pick-Up) | |
|---|---|---|
| Foam Sample | 90 angle | 45 angle |
| Prior Art L & P 1112 (¾") | 257 | 548 |
| Prior Art L & P 1115 (¼") | 290 | 552 |
| Skin Foam (¾") | 70.4 | 121 |

The values in Table II were obtained using the AATCC test method 42-1980 except that the sample weight increase was determined instead of blotter weight increase and used to calculate percentage wet pick-up because the sponge-like nature of the foams prevented water from passing through to the blotter. The sample size for the 90 degree test was a 7 inch by 12 inch rectangle, while the sample size for the 45 degree test was a 4⅝ inch diameter circle.

TABLE III

| | Surface Friction Resistance (lbs.) | |
|---|---|---|
| Foam Sample | 51 gm load | 1 lb. load |
| Prior Art L & P 1112 (¾") | 0.2 | 2.6 (avg.) |
| Skin Foam | 0.2 | 1.7 (avg.) |

The values of Table III were produced using a Scott tester in which a loaded sled is pulled across the surface of the test sample. Note that the friction with a one pound load of the foam in the garment according to the invention is significantly less than that for the prior art foam. This significant reduction in surface friction is also confirmed by the subjective reaction of workers who manufacture garments from the foam, the skinned foam construction universally being praised for improvements in handling, cutting, feeding, and stitching compared to conventional open cell foams. In cutting, the skin foam sheets have been determined to be much easier to align on the table, and the cutting knife slices through them with less difficulty than experience with conventional open cell polyurethane foam. Handling at the sewing machine is better than with standard foam, too. Alignment of plies for seaming is better, resistance or drag on the sewing table is reduced allowing easier and more even feeding, and the foam does not "spin" as much. In stitching, the skin foam reduces the thread splitting that occurs with standard foam, does not stretch as much during stitching, and there is less puckering and the pieces fit together better. Three-eighth inch skin foam is easier to sew than any other foam utilized in the manufacture of foam-containing cold weather garments to date, including ¼ inch conventional foam.

It will thus be seen that according to the present invention a cold weather garment is provided which is much easier to construct than prior art desirable cold weather garment (as exemplified by the Phillips system), yet has the same desirable properties as far as MVT value and cold weather insulation are concerned. Further, enhanced wind resistance and/or the ability to select from a wider variety of outer shell fabrics while achieving enhanced wind resistance are desirable attributes of the invention.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and constructions.

What is claimed is:

1. A cold weather garment comprising: an interior lining fabric; an outer fabric; a layer of open cell foam at least about ¼ inch thick between the interior lining fabric and the outer fabric; and the lining, foam layer, and outer fabric connected together by connecting means to form a garment; and wherein:
said foam layer has first and second major faces, said first face being flat, and disposed in abutting relationship with the outer fabric, and at least said first face having a skin so as to enhance ease of construction and wind resistance.

2. A garment as recited in claim 1 wherein the second face is convoluted, including peaks and valleys, and is in abutting relationship with said inner fabric.

3. A garment as recited in claim 1 wherein said foam is polyurethane foam, and wherein said foam layer has a thickness of about ¾ of an inch.

4. A garment as recited in claim 1 wherein both said first and second faces of said foam layer are substantially flat, skinned, faces.

5. A garment as recited in claim 1 wherein said foam layer comprises a plurality of sub layers, each sub layer having a first face thereof which is substantially flat and skinned, so as to enhance the wind resistance of the garment.

6. A garment as recited in claim 1 having a moisture vapor transmission value rate of at least 500 gms/sq. meter/24 hrs.

7. A garment as recited in claim 1 wherein said foam layer has an air permeability of less than about 10 cfm/sq. ft. at a pressure of 0.5 inches of water.

8. A garment as recited in claim 1 wherein said foam layer has a spray resistance of less than 100% wet pick-up at a 90 deg. angle of impact and less than 150% wet pick-up at a 45 deg. angle.

9. A garment as recited in claim 4 wherein said foam layer has a moisture transmission value rate of at least 500 gms/sq. meter/24 hrs., an air permeability of less than about 10 cfm/sq. ft. at a pressure of 0.5 inches of water, and a spray resistance of less than 100% wet pick-up at a 90 deg. angle of impact and less than 150% at a 45 deg. angle.

10. A garment as recited in claim 1 wherein said foam layer has a moisture transmission value rate of at least 500 gms/sq. meter/24 hrs., an air permeability of less than about 10 cfm/sq. ft. at a pressure of 0.5 inches of water, and a spray resistance of less than 100% wet pick-up at a 90 deg. angle of impact and less than 150% at a 45 deg. angle.

11. A garment as recited in claim 5 wherein two sub layers, each about ⅜ inch thick, having skinned first and second faces, are provided.

12. A garment as recited in claim 1 wherein said foam layer comprises a plurality of distinct foam sheets in edge-to-edge abutting engagement, and organic adhesive at the abutting edges holding respect sheets of foam together.

13. A garment as recited in claim 1 wherein said outer shell comprises a tightly knit synthetic yarn fabric having an air permeability value of less than about 10 cu. ft./sq. ft., at a pressure of 0.5 inches of water, treated with a water repellant coating.

14. A garment as recited in claim 13 wherein said outer shell fabric comprises approximately 210 denier continuous filament nylon warp yarn and 3 ply, approximately 70 denier air-textured nylon filling yarn woven in a plain weave having about 79 ends and about 61 picks per inch.

15. A garment as recited in claim 1 wherein said interior lining fabric has a moisture vapor transmission rate of at least about 1000 gms./sq. meter/24 hrs., and is of synthetic material.

16. A garment as recited in claim 15 wherein said interior lining fabric is a loosely knit synthetic yarn fabric.

17. A garment as recited in claim 1 consisting of said inner fabric, outer fabric, and foam layer.

18. A garment as recited in claim 1 wherein said skinned foam face has a surface friction of less than about 2 lbs. using a one lb. test load.

19. A garment as recited in claim 10 wherein said skinned foam face has a surface friction of less than about 2 lbs. using a one lb. test load.

20. A method of making a cold weather garment using an interior lining fabric, an outer fabric, and an open cell skinned foam layer having a thickness of at least about ¼ inch, comprising the steps of:
 (a) cutting a sheet of the skinned foam to a configuration desirable for the garment being produced, forming a number of different pieces of foam;
 (b) handling the foam pieces, including by sliding them across work surfaces, to align them in edge-to-edge configurations to form up a foam layer to be sandwiched between the two fabrics;
 (c) affixing the foam pieces in a substantially edge-to-edge configuration;
 (d) providing the attached foam pieces between the two fabrics; and
 (e) stitching the fabrics together, with foam layer therebetween, to form the desired garment.

21. A method as recited in claim 20 wherein step (c) consists essentially of the step of using organic adhesive to hold the foam pieces together.

22. A method as recited in claim 20 wherein step (c) is practiced by stitching foam pieces together.

* * * * *

UNITED STATES PATENT AND TRADEMARK OFFICE
CERTIFICATE OF CORRECTION

| | | |
|---|---|---|
| PATENT NO. | : | 4,734,306 |
| DATED | : | March 29, 1988 |
| INVENTOR(S) | : | B. Dean Lassiter |

It is certified that error appears in the above-identified patent and that said Letters Patent is hereby corrected as shown below:

In the cover sheet, under OTHER PUBLICATIONS, line 4, "Moter" should read --Mother--.
 Column 2, line 23, "degrees" should read --percent--; line 38, "knit" should read --yarn--. Column 3, line 32, "an" should read --and--. Column 4, line 44, "tightly knit nylon fabric" should read --tight nylon fabric--. Column 6, line 3, "experience" should read --experienced--; line 20, "garment" should read --garments--. Column 7, line 25, "respect" should read --respective--; line 30, "ft./sq. ft." should read --ft.$^3$/sq. ft./min.--.

Signed and Sealed this

Fifteenth Day of November, 1988

*Attest:*

DONALD J. QUIGG

*Attesting Officer*   *Commissioner of Patents and Trademarks*